UNITED STATES PATENT OFFICE

HENRY A. GARDNER, OF WASHINGTON, DISTRICT OF COLUMBIA

PROCESS OF MAKING ACETYLCELLULOSE

No Drawing.     Application filed April 27, 1928.  Serial No. 273,440.

This invention relates to improvements in processes of making acetylcellulose; and it comprises a method of recovering excess reagents from an acetylcellulose reaction mixture wherein acetylcellulose is precipitated from such a mixture by an addition of ethyl ether and the resultant mixture of ether and reagents is fractionally distilled to recover separately the ether and the reagents; all as more fully hereinafter set forth and as claimed.

In the usual methods of making acetylcellulose or cellulose acetate, cellulose is subjected to a reaction mixture ordinarily consisting of acetic anhydrid and glacial acetic acid with a small amount of such a catalyst as sulfuric acid. Sometimes acetyl chlorid is used instead of acetic anhydrid and sometimes zinc chlorid or other dehydrating catalyst is substituted for sulfuric acid. As the action goes on, the cellulose is dissolved or peptized, forming a fairly clear, viscous mass. The operation so far described produces a type of acetylcellulose soluble in chloroform. By adding a small amount of water to the reaction mixture at this point, other types of acetylcellulose are produced. Acetylcellulose soluble in acetone can be thus produced. In the usual practice after completion of the action, the reaction mixture is poured into water, which precipitates the cellulose acetate in a form which dries to a powdery mass.

In the reaction, it is customary to use more of the reagents, acetic anhydrid and glacial acetic acid, than is necessary for the reaction itself. On dilution with water both are converted into weak acetic acid (usually about 10 per cent in strength), recovery of which in the form of glacial acetic acid is expensive. The conversion of acetic anhydrid into weak acetic acid which thus takes place upon dilution of the reaction mixture with water is extremely uneconomic.

I have found that both of these reagents can be separately recovered in practically their original form by a cheap and simple process with simultaneous production of cellulose acetate in a desirable form.

The present process is based on the substitution of ether for water as a precipitant for the reaction mixture. Ether so used dilutes the reagents without hydrating them and permits their ready recovery without chemical change. I have found that an addition of ether to the reaction mixture separates acetylcellulose in a quantitative way. The reaction mixture can be simply poured into ether, whereupon the acetic anhydrid dissolves without hydration. The glacial acetic acid also dissolves. The precipitated acetylcellulose is further washed with ether, or refluxed therewith, the ether washings being added to the mother liquor separated. Refluxing with ether is an excellent way of effecting complete removal of reagents from the acetylcellulose. In refluxing, the cellulose acetate after precipitation and removal of the bulk of the mother liquor is placed in an apparatus of the Soxhlet type and refluxed with ether. Complete removal of reagents can be effected with a minimum quantity of ether.

On fractional distillation the mother liquor yields at first the ether used and subsequently the acetic acid and the acetic anhydrid. Ether distils over at about 35° C., glacial acetic acid at about 118° C. and the acetic anhydrid at about 137° C. Sometimes there is no great excess of acetic anhydrid in the reaction mixture; sometimes, there is a rather considerable amount. In either event, such as is present is recovered by the present process. Where cellulose acetate is made with the aid of acetyl chlorid, the excess acetyl chlorid can be recovered from the reaction mixture in the same way: by fractional distillation of ether used as a precipitant.

After precipitation and washing, the acetylcellulose is dried by warm air to remove residual ether. The ether so removed can be recovered in the usual way from the air used. After drying, the acetylcellulose may be immersed in water to insure removal of residual traces of acid and to produce stabilization. It is then dried and is in marketable form.

Other anhydrous liquids also capable of precipitating acetylcellulose, and freely miscible with glacial acetic acid and acetic anhydrid, such as glycol (advantageously ethylene glycol), can be used in lieu of ethyl ether with subsequent recovery of the reagents by fractional distillation; but ethyl ether because of its low and convenient boiling point, is a desirable body to use as it permits sharp separation in distillation. Other ethers such as methyl-ethyl ether, propyl ether, ethyl-propyl ether, butyl ether, etc. can be used but are not as cheap or desirable. Using ethylene glycol, in distillation it is recovered as the last fraction in lieu of the first as with ethyl ether; or, more exactly, as the remaining liquid when distillation is discontinued. Its use in this way is convenient since the united mother liquor and washings may be simply boiled to remove the glacial acetic acid and acetic anhydrid or acetyl chlorid, as the case may be.

In a specific embodiment of the present process, 100 parts by weight of acetylcellulose in any of the usual forms (cotton, paper, etc.) are acetylated by immersion in and agitation with a reaction mixture containing 250 parts by weight of acetic anhydrid, 400 parts by weight of glacial acetic acid and 5 parts by weight of ordinary sulfuric acid. If acetone-soluble acetylcellulose is to be produced, 30 parts of water may be added. Reaction takes place and the cellulose is acetylated and peptized or dissolved to a viscous, fairly clear liquid. After completion of the reaction, the clear viscous mass is poured into 700 to 800 parts by weight of ethyl ether. Cellulose acetate will be precipitated in a fibrous form. After thorough agitation, the cellulose acetate is pressed to remove as much of the liquid as possible. It is usually then further washed or refluxed with an additional quantity of ether. In washing it is convenient to use about 400 parts by weight of ether. Where washing is by refluxing, a less quantity of ether suffices. The washed acetylcellulose is then dried by warm air to remove residual ether; the evaporated ether being recovered from the air if it is deemed economical so to do. The dried acetylcellulose is then wet with water and again dried. It is now in marketable form.

The ethereal mother liquor formed in precipitation is united with the washings and the whole distilled in any convenient type of still adapted for fractionation. The ether goes over first and after it follow in succession the acetic acid and acetic anhydrid. There is no necessary hydration of either unless excess water has been added to the reaction mixture. I employ well-dried ether.

The present process is equally applicable to the recovery of reagents used in the acetylation of other carbohydrates than cellulose, as for instance in the acetylation of starch. Acetylated starch is precipitated from its solutions or dispersions by ether, and by glycol in the same way as acetylcellulose.

What I claim is:—

In the manufacture of acetylcellulose from cellulose with the aid of a reaction mixture containing acetic acid and acetic anhydrid, the process of recovering the reagents which comprises precipitating the reaction mixture with ethyl ether and washing the precipitated acetylcellulose with ether under refluxing conditions.

In testimony whereof, I have hereunto affixed my signature.

HENRY A. GARDNER.